(12) United States Patent
Working et al.

(10) Patent No.: US 8,608,993 B2
(45) Date of Patent: Dec. 17, 2013

(54) MECHANICALLY STRONG, THERMALLY STABLE, AND ELECTRICALLY CONDUCTIVE NANOCOMPOSITE STRUCTURE AND METHOD OF FABRICATING SAME

(75) Inventors: Dennis C. Working, Norfolk, VA (US); Emilie J. Siochi, Newport News, VA (US); Cheol Park, Yorktown, VA (US); Peter T. Lillehei, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 38 days.

(21) Appl. No.: 13/053,633

(22) Filed: Mar. 22, 2011

(65) Prior Publication Data

US 2011/0169187 A1    Jul. 14, 2011

Related U.S. Application Data

(62) Division of application No. 11/417,286, filed on Apr. 12, 2006, now abandoned.

(60) Provisional application No. 60/673,394, filed on Apr. 18, 2005.

(51) Int. Cl.
*B29C 47/00* (2006.01)

(52) U.S. Cl.
USPC .................. 264/108; 264/5; 264/6; 264/118; 264/119

(58) Field of Classification Search
USPC .................. 264/5, 6, 108, 118, 119
See application file for complete search history.

(56) References Cited

U.S. PATENT DOCUMENTS

| 3,585,259 | A  | * | 6/1971  | Lefferts ......................... 264/50 |
| 3,655,850 | A  | * | 4/1972  | Woodham ..................... 264/118 |
| 4,692,371 | A  | * | 9/1987  | Morman et al. ............... 442/329 |
| 5,385,776 | A  |   | 1/1995  | Maxfield et al. |
| 6,265,466 | B1 | * | 7/2001  | Glatkowski et al. .......... 523/137 |
| 6,726,989 | B2 |   | 4/2004  | Dugan |
| 6,762,237 | B2 |   | 7/2004  | Glatkowski et al. |
| 6,818,163 | B1 |   | 11/2004 | Fibiger et al. |
| 6,916,872 | B2 |   | 7/2005  | Yadav et al. |
| 6,934,600 | B2 | * | 8/2005  | Jang et al. ..................... 700/182 |
| 2002/0143094 | A1 |   | 10/2002 | Conroy et al. |
| 2002/0185770 | A1 | * | 12/2002 | McKague ..................... 264/108 |
| 2003/0230820 | A1 | * | 12/2003 | Gralinski et al. ................ 264/5 |
| 2004/0054056 | A1 |   | 3/2004  | Barber et al. |
| 2004/0176513 | A1 |   | 9/2004  | Cakmak et al. |
| 2005/0143508 | A1 |   | 6/2005  | Tyagi et al. |
| 2005/0173840 | A1 |   | 8/2005  | Wan et al. |

* cited by examiner

*Primary Examiner* — Timothy Kennedy
*Assistant Examiner* — David N Brown, II
(74) *Attorney, Agent, or Firm* — Jennifer L. Riley

(57) ABSTRACT

A nanocomposite structure and method of fabricating same are provided. The nanocomposite structure is a polymer in an extruded shape with carbon nanotubes (CNTs) longitudinally disposed and dispersed in the extruded shape along a dimension thereof. The polymer is characteristically defined as having a viscosity of at least approximately 100,000 poise at a temperature of 200° C.

19 Claims, 1 Drawing Sheet

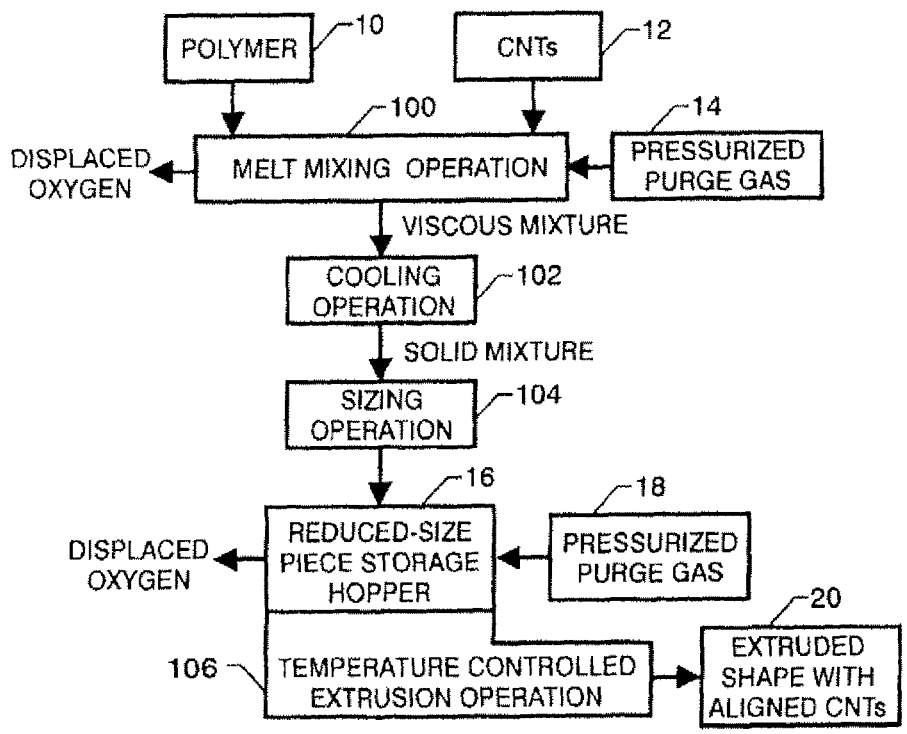
FIG. 1
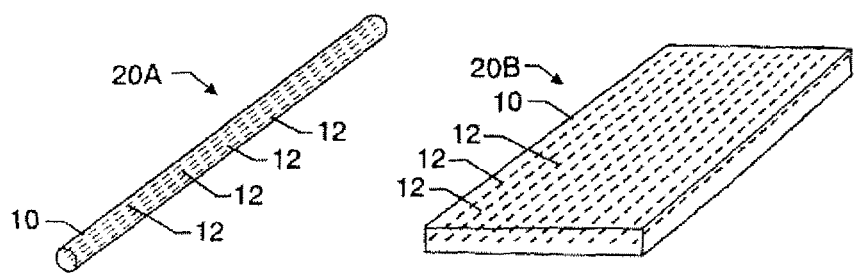
FIG. 2
FIG. 3

US 8,608,993 B2

MECHANICALLY STRONG, THERMALLY STABLE, AND ELECTRICALLY CONDUCTIVE NANOCOMPOSITE STRUCTURE AND METHOD OF FABRICATING SAME

This patent application is a divisional of copending U.S. patent application Ser. No. 11/417,286, filed Apr. 12, 2006. Pursuant to 35 U.S.C. §119, the benefit of priority from provisional application 60/673,394, with a filing date of Apr. 18, 2005, is claimed for this non-provisional application.

ORIGIN OF THE INVENTION

This invention was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to material structures that are mechanically strong. More specifically, the invention relates to nanocomposite structures that are mechanically strong, thermally stable, and electrically conductive, as well as a method of fabricating same.

2. Description of the Related Art

The state-of-the-art in lightweight and mechanically strong structures is centered around graphite fiber composites. While graphite fibers have excellent mechanical properties, they do not have the desired thermal or electrical conductivities. Accordingly, when graphite fiber composites are to be used in high temperature environments, specialized high temperature or thermally conductive coatings are applied to the structure. When graphite fiber composite structures and/or their surrounding environment must be monitored, sensors and their associated wiring must be attached to or embedded in the structure. These extra coatings, sensors and/or wiring add weight and cost to the ultimate structure.

SUMMARY OF THE INVENTION

Accordingly, it is an object of the present invention to provide a high-strength structure that is stable in high temperature environments and that has electrical conductivity characteristics.

Another object of the present invention is to provide a method of fabricating a high-strength structure that is stable in high temperature environments and has electrical conductivity characteristics.

Other objects and advantages of the present invention will become more obvious hereinafter in the specification and drawings.

In accordance with the present invention, a nanocomposite structure and method of fabricating same are provided. The nanocomposite structure is a polymer in an extruded shape with a plurality of carbon nanotubes (CNTs) longitudinally disposed and dispersed in the extruded shape along a dimension thereof. The polymer is characteristically defined as having a viscosity of at least approximately 100,000 poise at a temperature of 200° C.

In the fabrication method, the CNTs are mixed with the polymer at a temperature of at least 200° C. to form a viscous mixture. An inert gas is passed through the viscous mixture to purge oxygen therefrom during mixing. The viscous mixture is cooled to form a solid form of the viscous mixture that is then broken into pieces not to exceed approximately 0.125 inches in diameter. The pieces are converted into an extruded shape to thereby align the CNTs longitudinally along a dimension of the extruded shape.

BRIEF DESCRIPTION OF THE DRAWINGS

FIG. 1 is a schematic view of the method used to fabricate a nanocomposite structure in accordance with the present invention;

FIG. 2 is a perspective view of an extruded-fiber nanocomposite structure fabricated in accordance with the present invention; and FIG. 3 is a perspective view of an extruded-ribbon nanocomposite structure fabricated in accordance with the present invention.

DETAILED DESCRIPTION OF THE INVENTION

Referring now to the drawings, and more particularly to FIG. 1, a schematic view of the nanocomposite structure fabrication process of the present invention is shown. It is to be understood at the outset that the fabrication process steps can be carried out using a variety of different equipment/apparatus without departing from the scope of the present invention.

Before describing the nanocomposite structure fabrication process, the two raw materials operated on thereby will first be described. In general, the raw materials consist of a polymer 10 and carbon nanotubes (CNTs) 12. One of the goals of the present invention is to produce a mechanically strong nanocomposite structure that is stable at relatively high temperatures (e.g., on the order of 150° C. or greater). To achieve this, polymer 10 must be selected from a class of thermally-stable polymer materials. For purpose of the present invention, the characteristics of polymer 10 are defined as a polymer material having a viscosity of at least approximately 100,000 poise at a temperature of approximately 200° C. While these types of polymers provide a high degree of thermal stability, they are also extremely difficult to process where processing requires the melting thereof. That is, while these polymers require high processing temperatures, material degradation generally occurs at temperatures that are not that much greater than the melt processing temperature. Accordingly, these materials generally present small windows of effective processing temperatures. However, as will be explained further below, the process of the present invention improves the processability of these polymers.

The second raw materials used in the nanocomposite structure and process of the present invention are CNTs 12. As is well known in the art, CNTs are single or multi-wall graphene cylinders. Single-wall CNTs (or SWCNTs) typically have diameters on the order of nanometers with lengths of several microns. In general, the SWCNTs used to fabricate the present invention's nanocomposite structure are defined by a length-to-diameter aspect ratio of 100 or more. Multi-wall CNTs can have two, a few or many walls, thereby increasing their overall diameters. The choice of CNT-type is not a limitation of the present invention although it was found that the weight/volume percent of CNTs required was lower for SWCNTs (approximately 1% or less) than for multi-wall CNTs (approximately 5% or less).

Appropriate quantities of polymer 10 and CNTs 12 are processed together in a melt mixing operation 100 that utilizes a conventional melt mixer apparatus (not shown) well known in the art. In essence, operation 100 melts polymer 10 while mixing CNTs 12 therein such that a viscous mixture is generated. During melt mixing operation 100, a pressurized purge gas is pumped through the viscous mixture in order to displace oxygen from the mixture. The purge gas should be an inert gas such as nitrogen, argon or helium. By displacing oxygen from the mixture, degradation of polymer 10 during the melting thereof is prevented or, at the very least delayed, thereby allowing melt mixing operation 100 to continue for a longer period of time than would be possible without the oxygen purge. In this way, good CNT dispersion within the melted polymer is achieved.

As just mentioned, melt mixing operation 100 produces a viscous mixture that is then cooled to a solid mixture by a cooling operation 102. Such cooling can be achieved in an active or passive fashion without departing from the scope of the present invention. The resulting solid mixture is next provided to a sizing operation 104.

Sizing operation 104 reduces the above-described solid mixture to pieces small enough to undergo an extrusion operation. In general, state-of-the-art extruders require the pieces to be no larger than approximately 0.125 inches in diameter. Accordingly, sizing operation 104 can be accomplished by any of a variety of pelletizing or pulverizing (e.g., ground, crushed or otherwise reduced in size) operations/apparatus.

The reduced-size pieces of the solid mixture are stored in a tank or hopper 16. Pressurized purge gas 18 (e.g., nitrogen, argon, helium, etc.) is flowed through the reduced-size pieces in hopper 16 in order to displace oxygen from the spaces between the pieces. In this way, the pieces supplied to a temperature-controlled extrusion operation 106 have little or no oxygen accompanying them during extrusion.

Temperature-controlled extrusion operation 106 is any process/apparatus capable of generating an extrudate while controlling the temperature of the materials being extruded. One such extruder is disclosed by D. C. Working et al. in "Microextruder for Polymer Characterization," SAMPE Technical Conference, 1994, 26:700. Temperature used in extrusion operation 106 should be sufficient to melt the polymer portion of the pieces (i.e., the CNTs do not melt) of the solid mixture. Extrusion operation 106 generates shear forces such that the CNTs in the molten portion of the pieces tend to align themselves longitudinally in the direction that the material is being drawn by operation 106. As a result, operation 106 produces a nanocomposite structure having an extruded shape 20 that has CNTs longitudinally aligned along the drawn dimension of shape 20.

Extrusion operation 106 can be used to generate a variety of geometrically-shaped extrudates depending on the extrusion die. Two such typical shapes of a nanocomposite structure are illustrated in FIGS. 2 and 3. More specifically, the process of the present invention can be used to produce a fiber-shaped nanocomposite structure 20A (FIG. 2) or a ribbon-shaped nanocomposite structure 20B (FIG. 3). In either case, each nanocomposite structure has CNTs 12 longitudinally disposed and dispersed within the surrounding polymer 10 where CNTs 12 are longitudinally aligned along a dimension (e.g., the length) of the structure.

By way of example, it is believed that a resulting nanocomposite prepared by the inventive process will have good mechanical properties and will have good thermal characteristics owing to the properties of the base polymers. Longitudinal alignment of the CNTs should provide a degree of electrical conductivity. Thus, the present invention can be used to provide a new class of mechanically strong, thermally stable and electrically conductive nanocomposites.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of fabricating a nanocomposite structure, comprising the steps of: providing a polymer characteristically defined as having a viscosity of at least approximately 100,000 poise at a temperature of 200° C.; mixing carbon nanotubes (CNTs) with said polymer at a temperature of at least 200° C. to form a viscous mixture; flowing an inert gas through said viscous mixture to purge oxygen therefrom during said step of mixing; cooling said viscous mixture wherein a solid form of said viscous mixture is generated; breaking said solid form into pieces not to exceed approximately 0.125 inches in diameter; and converting said pieces into an extruded shape in which said CNTs are longitudinally aligned along a dimension of said extruded shape in which the CNTs are longitudinally aligned along a dimension of said extruded shape wherein said step of converting comprises flowing a second inert gas through said pieces in a storage hopper to purge oxygen from spaces between said pieces.

2. A method according to claim 1 wherein said extruded shape is a fiber and said dimension is the length of said fiber.

3. A method according to claim 1 wherein each of said first inert gas and said second inert gas is selected from the group consisting of argon, helium and nitrogen.

4. A method according to claim 1 wherein said step of breaking comprises a step selected from the group of pulverizing said solid form and pelletizing said solid form.

5. A method according to claim 1 wherein said step of converting further comprises the steps of:
  collecting said pieces in a storage hopper;
  depositing said pieces from the hopper in a temperature-controlled extruder wherein said extruded shape is output therefrom.

6. A method according to claim 1 wherein said CNTs comprise one of a weight percent and volume percent thereof not to exceed approximately 5% of said viscous mixture.

7. A method according to claim 1 wherein said CNTs comprise single-wall CNTs (SWCNTs) in one of a weight percent and volume percent thereof not to exceed approximately 1% of said viscous mixture.

8. A method of fabricating a nanocomposite structure, comprising the steps of:
  providing a polymer characteristically defined as having a viscosity of at least approximately 100,000 poise at a temperature of 200° C.;
  mixing carbon nanotubes (CNTs) with said polymer at a temperature of at least 200° C. to form a viscous mixture;
  flowing a first inert gas through said viscous mixture to purge oxygen therefrom during said step of mixing;
  cooling said viscous mixture wherein a solid form of said viscous mixture is generated;
  breaking said solid form into pieces not to exceed approximately 0.125 inches in diameter;
  collecting said pieces in a storage hopper;
  flowing a second inert gas through said pieces in said storage hopper to purge oxygen from spaces between said pieces; and depositing said pieces from said hopper in a temperature-controlled extruder that forms an extruded fiber in which said CNTs are longitudinally aligned along the length thereof.

9. A method according to claim 8 wherein each of said first inert gas and said second inert gas is selected from the group consisting of argon, helium and nitrogen.

10. A method according to claim 8 wherein said step of breaking comprises a step selected from the group of pulverizing said solid form and pelletizing said solid form.

11. A method according to claim 8 wherein said CNTs comprise one of a weight percent and volume percent thereof not to exceed approximately 5% of said viscous mixture.

12. A method according to claim 8 wherein said CNTs comprise single-wall CNTs (SWCNTs) in one of a weight percent and volume percent thereof not to exceed approximately 1% of said viscous mixture.

13. A method of fabricating a nanocomposite structure, comprising the steps of: providing a polymer characteristically defined as having a viscosity of at least approximately 100,000 poise at a temperature of 200° C.; mixing carbon nanotubes (CNTs) with said polymer to form a viscous mixture; flowing an inert gas through said mixture to purge oxygen therefrom during said step of mixing; controlling temperature of said mixture; and converting said mixture into an extruded shape in which said CNTs are longitudinally aligned along a dimension of said extruded shape, wherein said step of converting comprises flowing a second inert gas through said pieces in a storage hopper to purge oxygen from the spaces between said pieces.

14. A method according to claim 13, further comprising the steps of forming a solid material of said mixture and of grinding said solid material into pieces not to exceed approximately 0.125 inches in diameter.

15. A method according to claim 13, wherein said step of converting comprises using a temperature-controlled extruder.

16. A method according to claim 13, further comprising the step of recovering said extruded shape.

17. A method according to claim 16, wherein said extruded shape comprises an extruded fiber in which said CNTs are longitudinally aligned along the length thereof.

18. A method according to claim 17, wherein said CNTs are present in said fiber in an amount of less than or equal to about 1 wt-% of said fiber.

19. A method according to claim 13, wherein said mixing step is conducted at a temperature of at least about 200° C.

* * * * *